United States Patent
Ballantine et al.

(10) Patent No.: US 7,332,236 B2
(45) Date of Patent: Feb. 19, 2008

(54) METHOD AND APPARATUS FOR CONTROLLING A COMBINED HEAT AND POWER FUEL CELL SYSTEM

(75) Inventors: Arne W. Ballantine, Round Lake, NY (US); Ryan Hallum, Latham, NY (US); John W. Parks, Loudonville, NY (US); Dustan L. Skidmore, Troy, NY (US)

(73) Assignee: Plug Power Inc., Latham, NY (US)

( * ) Notice: Subject to any disclaimer, the term of this patent is extended or adjusted under 35 U.S.C. 154(b) by 182 days.

(21) Appl. No.: 11/219,904

(22) Filed: Sep. 6, 2005

(65) Prior Publication Data

US 2006/0003199 A1    Jan. 5, 2006

Related U.S. Application Data

(62) Division of application No. 10/158,253, filed on May 30, 2002, now Pat. No. 6,939,635.

(60) Provisional application No. 60/294,776, filed on May 31, 2001.

(51) Int. Cl.
 *H01M 8/04* (2006.01)
(52) U.S. Cl. .............................. 429/13; 429/24; 429/26
(58) Field of Classification Search .................. 429/13, 429/22, 24, 26
See application file for complete search history.

(56) References Cited

U.S. PATENT DOCUMENTS

| | | | |
|---|---|---|---|
| 5,346,778 A * | 9/1994 | Ewan et al. | 429/19 |
| 6,025,083 A * | 2/2000 | Veyo et al. | 429/13 |
| 6,096,449 A * | 8/2000 | Fuglevand et al. | 429/13 |
| 6,620,538 B2 * | 9/2003 | Bai et al. | 429/23 |
| 2001/0014414 A1 * | 8/2001 | Okamoto et al. | 429/20 |
| 2002/0160243 A1 * | 10/2002 | Ueda et al. | 429/24 |

* cited by examiner

*Primary Examiner*—Tracy Dove
(74) *Attorney, Agent, or Firm*—Trop, Pruner & Hu, P.C.

(57) ABSTRACT

A cogeneration fuel cell system and associated methods of operation are provided that accommodate a demand for heat as well as a demand for electric power. The system is operated among various modes to balance heat and power demand signals. In general, a fuel cell system is coupled to a power sink and a heat sink, and a controller is adapted to respond to data signals from the power sink and the heat sink. As examples, such data signals from the heat sink may include a temperature indication or a heat demand signal (such as from a thermostat), and such data signals from the power sink may include a voltage or current measurement, an electrical power demand signal, or an electrical load.

10 Claims, 9 Drawing Sheets

METHOD AND APPARATUS FOR CONTROLLING A COMBINED HEAT AND POWER FUEL CELL SYSTEM

This application is a divisional of U.S. patent application Ser. No. 10/158,253, entitled "METHOD AND APPARATUS FOR CONTROLLING A COMBINED HEAT AND POWER FUEL CELL SYSTEM," filed on May 30, 2002, which is now U.S. Pat. No. 6,939,635, issued Sep. 6, 2005, which claims the benefit under 35 USC 119(e) to U.S. Provisional Application No. 60/294,776, filed May 31, 2001, naming Ballantine, Hallum, Parks and Skidmore as inventors, and entitled "METHOD AND APPARATUS FOR CONTROLLING A COMBINED HEAT AND POWER FUEL CELL SYSTEM."

CROSS REFERENCE TO RELATED APPLICATIONS

This application is related to U.S. patent application Ser. Nos. 11/220,201 and 11/219,898, each of which are entitled, "METHOD AND APPARATUS FOR CONTROLLING A COMBINED HEAT AND POWER FUEL CELL SYSTEM," and are filed concurrently herewith.

BACKGROUND

The invention generally relates to a combined heat and power fuel cell system and associated methods of operation.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

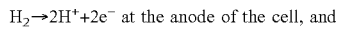
$H_2 \rightarrow 2H^+ + 2e^-$ at the anode of the cell, and

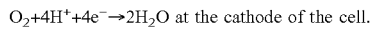
$O_2 + 4H^+ + 4e^- \rightarrow 2H_2O$ at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. The amount of a reactant supplied may be referred to in terms of "stoich". For example, for a given electrical load on a fuel cell, one stoich of hydrogen and one stoich of air would refer to the minimum amount of each reactant theoretically required to produce enough electrons to satisfy the load (assuming all of the reactants will react). However, in some cases, not all of the hydrogen or air supplied will actually react, so that it may be necessary to provide excess fuel and air stoichiometry so that the amount actually reacted will be appropriate to satisfy a given power demand.

Hydrogen that is not reacted in the fuel cell may be vented to the atmosphere with the fuel cell exhaust, and in some cases may be oxidized before it is vented. Such exhaust may also contain small amounts of hydrocarbons that "slip" through the fuel processor without being reacted. Substantial heat may be generated as these exhaust components are oxidized, for example by mixing them with air and passing them through a platinum-coated ceramic monolith similar to an automotive catalytic converter.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time.

There is a continuing need for systems and algorithms to achieve objectives including the foregoing in a robust and cost effective manner.

SUMMARY

The invention provides a combined heat and power fuel cell system and associated methods of operation. Such systems are commonly referred to as cogeneration systems. In general, the system and methods of the invention relate to operation of a fuel cell system among various modes and configurations to balance heat and power demand signals. The fuel cell system is coupled to both a power sink and a heat sink. A controller is adapted to coordinate response to data signals from the power sink and the heat sink. As examples, such data signals from the heat sink may include a temperature indication or a heat demand signal (such as from a thermostat), and such data signals from the power sink may include a voltage or current measurement, an electrical power demand signal, or an electrical load.

In one aspect, the invention provides a method of operating a fuel cell system including the following steps: (1) providing a fuel flow and an oxidant flow to a fuel cell stack to produce electricity; (2) providing the electricity to an electrical load; (3) transferring heat from the fuel cell stack to a heat sink by circulating a first coolant through a first coolant circuit, wherein the first coolant circuit is adapted to remove heat from the fuel cell stack and is further adapted to transfer heat to the heat sink; (4) measuring a thermal parameter of the heat sink; (5) generating a heat demand signal when the thermal parameter of the heat sink is below a predetermined level; and (6) shorting at least one fuel cell in the fuel cell stack in response to the heat demand signal. The heat sink can be a water tank, a body of air contained in a building, a generator portion of an adsorption cooling system, etc. The thermal parameter generally refers to a temperature of the heat sink.

In another aspect, the invention provides a method of operating a fuel cell system, including the following steps: (1) providing a fuel flow and an oxidant flow to a fuel cell stack to produce electricity; (2) providing the electricity to an electrical load; (3) transferring heat from the fuel cell stack to a heat sink by circulating a first coolant through a first coolant circuit, wherein the first coolant circuit is adapted to remove heat from the fuel cell stack and is further adapted to transfer heat to the heat sink; (4) measuring a thermal parameter of the heat sink; (5) generating a heat demand signal when the thermal parameter of the heat sink is below a predetermined level; and (6) selectively connecting at least two fuel cells in the fuel cell stack in parallel in response to the heat demand signal.

In one embodiment, the balance between the heat and power demand signals is accommodated by selectively connecting at least two fuel cells within a group to increase the amount of heat that is generated for a given amount of power production. Where a system is adapted to selectively connect one or more cells in parallel, the cells that are selectively connected are connected via a switched network, rather than being stack in series as in a conventional stack. The heat sink can be a water tank, a body of air contained in a building, a generator portion of an adsorption cooling system, etc. The thermal parameter generally refers to a temperature of the heat sink.

In another aspect, the invention provides a method of operating a fuel cell system, including the following steps: (1) providing a fuel flow and an oxidant flow to a fuel cell stack to produce electricity; (2) providing the electricity to an electrical load; (3) transferring heat from the fuel cell stack to a heat sink by circulating a first coolant through a first coolant circuit, wherein the first coolant circuit is adapted to remove heat from the fuel cell stack and is further adapted to transfer heat to the heat sink; (4) measuring a thermal parameter of the heat sink; (5) generating a heat demand signal when the thermal parameter of the heat sink is below a predetermined level; and (6) selectively operating the fuel cell in a low efficiency mode in response to the heat demand signal.

There are various fuel cell operating regimes that result in relatively low efficiency operation and the production of relatively high amounts of waste heat. Prior art systems are generally configured to avoid such regimes as a means of maximizing system efficiency. However, in systems balancing both heat demand and power demand signals, it may be desirable to switch between such modes. Other examples of low efficiency operating modes include reactant starvation, operation at temperatures outside the normal operating range of a fuel cell, and producing a given amount of power at low voltage and high current (e.g., cell voltages less than 0.4 volts).

Advantages and other features of the invention will become apparent from the following description, drawings and claims.

DETAILED DESCRIPTION

Figure 1:
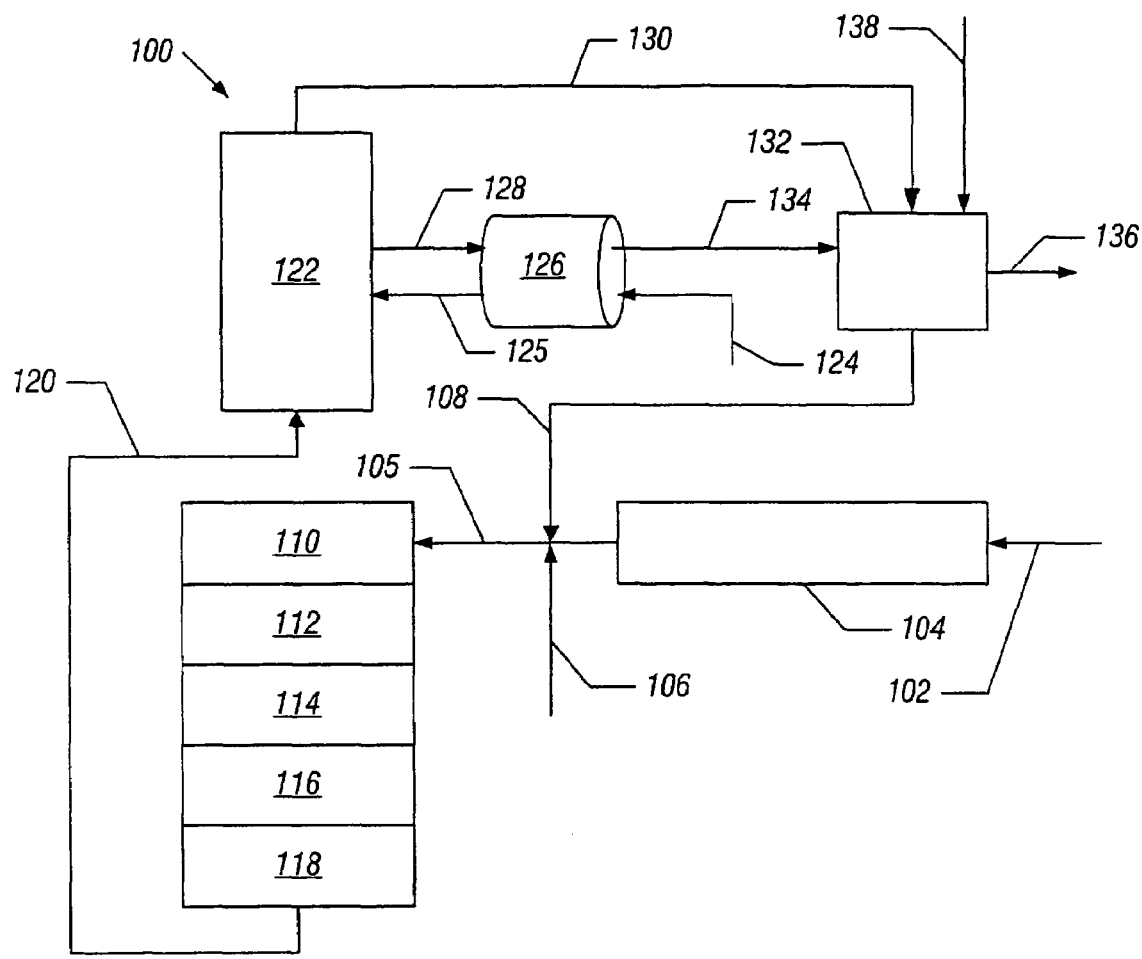
FIG. 1 is a schematic diagram of an integrated fuel cell system.

Referring to FIG. 1, an integrated fuel cell system 100 is shown. Natural gas is injected into the system through conduit 102. The natural gas flows through desulfurization vessel 104, which contains a sulfur-adsorbent material such as activated carbon. The de-sufurized natural gas is then flowed to a conversion reactor 110 via conduit 105. Before being reacted in the conversion reactor 110, the de-sulfurized natural gas is mixed with air 106 and steam 108. It will be appreciated that the conversion reactor 110 is an autothermal reactor. The converted natural gas, referred to as reformate, then flows through a series of high temperature shift reactors 112 and 114, through a low temperature shift reactor 116, and then through a PROX reactor 118. It will be appreciated that the primary function of this series of reactors is to maximize hydrogen production while minimizing carbon monoxide levels in the reformate. The reformate is then flowed via conduit 120 to the anode chambers (not shown) of a fuel cell stack 122.

Air enters the system via conduit 124 and through conduit 106 as previously mentioned. In the present example, the fuel cell stack 122 uses sulfonated fluourocarbon polymer PEMs that need to be kept moist during operation to avoid damage. While the reformate 120 tends to be saturated with water, the ambient air 124 tends to be subsaturated. To prevent the ambient air 124 from drying out the fuel cells in stack 122, the air 124 is humidified by passing it through an enthalpy wheel 126, which also serves to preheat the air 124. The theory and operation of enthalpy wheels are described in U.S. Pat. No. 6,013,385, which is hereby incorporated by reference. The air 124 passes through the enthalpy wheel 126 through the cathode chambers (not shown) of the fuel cell stack 122 via conduit 125. The air 124 picks up heat and moisture in the stack 122, and is exhausted via conduit 128 back through the enthalpy wheel 126. The enthalpy wheel 126 rotates with respect to the injection points of these flows such that moisture and heat from the cathode exhaust 128 is continually passed to the cathode inlet air 124 prior to that stream entering the fuel cell.

The anode exhaust from the fuel cell is flowed via conduit 130 to an oxidizer 132, sometimes referred to as an "anode tailgas oxidizer". The cathode exhaust leaves the enthalpy wheel 126 via conduit 134 and is also fed to the oxidizer 132 to provide oxygen to promote the oxidation of residual hydrogen and hydrocarbons in the anode exhaust 130. As examples, the oxidizer 132 can be a burner or a catalytic burner (similar to automotive catalytic converters). The exhaust of the oxidizer is vented to ambient via conduit 136. The heat generated in the oxidizer 132 is used to convert a water stream 138 into steam 108 that is used in the system.

Figure 2:
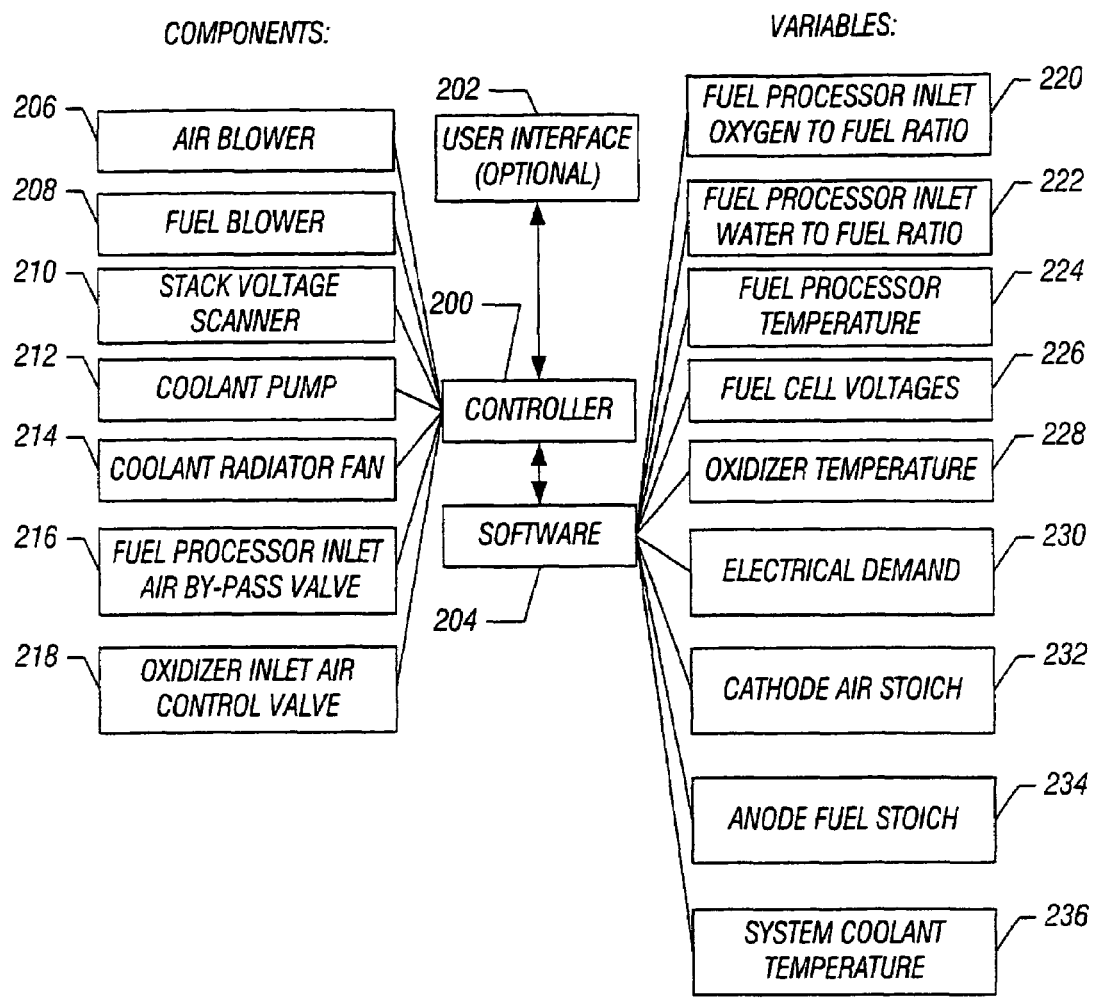
FIG. 2 is a schematic diagram of a control system for an integrated fuel cell system.

Referring to FIG. 2, a schematic is shown of a control system for an integrated high temperature PEM fuel cell system. Such a control system can include the following components, as examples: (200) an electronic controller, e.g., a programmable microprocessor; (202) a graphical user interface; (204) software for instructing the controller; (206) an air blower for providing the system with air, e.g., the fuel cell cathode and/or the fuel processor; (208) a fuel blower for driving hydrocarbon into the fuel processor; (210) a stack voltage scanner for measuring the stack voltage and/or the individual voltages of fuel cells within the stack; (212) a coolant pump for circulating a coolant through the fuel cell stack to maintain a desired stack operating temperature; (214) a coolant radiator and fan for expelling heat from the coolant to ambient; (216) a fuel processor inlet air by-pass valve for controlling the amount of air fed to the fuel processor; and (218) an oxidizer inlet air control valve.

Such a control system can operate to control the following variables, as examples: (220) the fuel processor inlet oxygen to fuel ratio; (222) the fuel processor inlet water to fuel ratio; (224) a fuel processor reactor temperature; (226) the voltage of the fuel cell stack or of individual fuel cells within the stack; (228) the oxidizer temperature; (230) electrical demand on the fuel cell system; (232) the cathode air stoich; (234) the anode fuel stoich; and (236) the system coolant temperature.

As examples, suitable fuel processor systems are described in U.S. Pat. Nos. 6,207,122, 6,190,623, and 6,132,689, which are hereby incorporated by reference. For instance, in the case of a natural gas fuel processor, the system may include a variable speed blower for injecting natural gas into the system, and a variable speed air blower for injecting air into the system. The gas and air may be mixed in a mixing chamber, humidified to a desired level (e.g., the system may include some method of steam generation), and be preheated (e.g., in a gas/gas heat exchanger with heat from product gas from the fuel processor). The reactant mixture may then be reacted in an autothermal reactor (ATR) to convert the natural gas to synthesis gas ($H_2O+CH_4 \rightarrow 3H_2+CO$; $1/2O_2+CH_4 \rightarrow 2H_2+CO$). The fuel processor may also include a shift reactor ($CO+H_2O \rightarrow H_2+CO_2$) to shift the equilibrium of the synthesis gas toward hydrogen production to minimize carbon monoxide (CO). The fuel processor may include multiple shift reactor stages.

Some fuel processor systems may also include a preferential oxidation (PROX) stage ($CO+1/2O_2 \rightarrow CO_2$) to further reduce carbon monoxide levels.

The PROX reaction is generally conducted at lower temperatures that the shift reaction, such as 100-200° C. Like the CPO reaction, the PROX reaction can also be conducted in the presence of an oxidation catalyst such as platinum. The PROX reaction can typically achieve CO levels less than 100 ppm. Other non-catalytic CO reduction and reformate purification methods are also known, such as membrane filtration and pressure swing adsorption systems.

In some embodiments, the autothermal reactor can be replaced by a reforming reactor (e.g., utilizing the endothermic steam reforming reaction: $H_2O+CH_4 \rightarrow 3H_2+CO$), or by a catalytic partial oxidation reactor (CPO reactor: $1/2O_2+CH_4 \rightarrow 2H_2+CO$), which is exothermic. These terms are sometimes used loosely or interchangeably. In general, an autothermal reactor is a reactor that combines the reforming and catalytic partial oxidation reactions to achieve a balance between the respective endothermic and exothermic elements. It should be noted that fuel processors are sometimes generically referred to as reformers, and the fuel processor output gas is sometimes generically referred to as reformate, without respect to the reaction that is actually employed.

The ATR catalyst can be a ceramic monolith that has been wash-coated with a platinum catalyst (as known in the art, e.g., operating at over 600° C.). The shift catalyst can also be platinum wash-coated ceramic monolith (e.g., operating between 300-600° C.). The shift reactor can also include a catalyst that is operable at lower temperatures. Other suitable catalyst and reactor systems are known in the art.

In some embodiments, a desulfurization stage may be placed upstream from the fuel processor to remove sulfur compounds from the fuel before it is reacted (e.g., to avoid poisoning the catalysts of the fuel processor and/or the fuel cell stack). For example, activated carbon, zeolite, and activated nickel materials are all known in the art for such application.

As known in the art, it may be desirable to control the water to fuel ratio (e.g., steam to carbon ratio) that is fed to the ATR. For example, it may be desirable to provide on average at least two water molecules for every carbon atom provided in the fuel to prevent coking. It may also be desirable in some embodiments to adjust the air stoich through the fuel cell stack to control the amount of oxygen that is introduced into the fuel processor with respect to the amount of fuel that is introduced (e.g., $O_2:CH_4$ ratio, which can effect the operation temperature of the ATR as an example).

Suitable fuel cell stack designs are well known. For example, the fuel cell systems taught in U.S. Pat. Nos. 5,858,569, 5,981,098, 5,998,054, 6,001,502, 6,071,635, 6,174,616, and Ser. No. 09/502,886 are each hereby incorporated by reference. In an integrated fuel cell system, the fuel cell stack may be associated with additional components and subsystems. A coolant system may be used to circulate a liquid coolant through the stack to maintain a desired operating temperature. A radiator or other heat transfer device may be placed in the coolant path to provide coolant temperature control. The coolant may also perform heat transfer in other areas of the system, such as in the fuel processor, or cooling reactants exiting the fuel processor to a desired temperature before entering the fuel cell stack. As an example, the coolant may be circulated by a variable speed pump.

The reactant delivery system associated with the fuel cell stack may include a variable speed air blower or compressor, and variable position valves and/or orifices to control the amount and pressure of fuel and air provided to the stack, as well as the ratio between the two. For a given electrical load, a certain amount of reactants must be reacted in the fuel cell to provide the power demanded by the load. In this sense, the amount of air and fuel supplied to the fuel cell stack may each be referred to in terms of stoichiometry (i.e., the stoichiometric equations associated with the fuel cell reactions: $H_2 \rightarrow 2H^++2e^-$; and $O_2+4H^++4e^- \rightarrow 2H_2O$). For example, supplying 1 "stoich" of reformate means that enough reformate is supplied to the fuel cell stack to satisfy the power demand of the load, assuming that all of the hydrogen in the reformate reacts. However, since not all of the hydrogen in the reformate will actually react, the fuel may be supplied at an elevated stoich (e.g., 2 stoich would refer to twice this amount) to ensure that the amount that actually will react will be enough to meet the power demand. Similarly, air may also be supplied to the fuel cell stack in excess of what is theoretically needed (e.g., 2 stoich).

The reactant plumbing associated with the stack may be conducted in part by a manifold. For example, the teachings of U.S. patent Ser. No. 09/703,249 are hereby incorporated by reference. Such a manifold may be further associated with a water collection tank that receives condensate from water traps in the system plumbing. The water tank may include a level sensor. Some fuel cell systems may require an external source of water during operation, and may thus include a connection to a municipal water source. A filter may be associated with the connection from the municipal water supply, such as a particulate filter, a reverse osmosis membrane, a deionization bed, etc.

Some fuel cell membranes, such as those made from sulfonated flourocarbon polymers, require humidification. For example, it may be necessary to humidify reactant air before it is sent through the fuel cell in order to prevent drying of the fuel cell membranes. In such systems, a reactant humidification system may be required. It will be appreciated that in systems utilizing reformate, this generally refers to humidifying only the air fed to the fuel cell stack and not the fuel stream, since the reformate exiting the fuel processor is generally saturated. One method of humidification is to generate steam which is supplied to a reactant stream. Membrane humidification systems are also known, as well as enthalpy wheel systems, as taught in U.S. Pat. No. 6,013,385, which is hereby incorporated by reference.

The spent fuel exhausted from the fuel cell stack may contain some amount of unreacted hydrogen or unreacted hydrocarbon or carbon monoxide from the fuel processor. Before the spent fuel is vented to the atmosphere, it may be sent through an oxidizer to reduce or remove such components. Suitable oxidizer designs are known, such as burner designs, and catalytic oxidizers similar to automotive catalytic converters. Oxidizers may utilize air exhausted from the fuel cell stack, and may have an independent air source, such as from a blower. In some systems, the heat generated by the oxidizer may be used, for example, to generate steam for use in the fuel processor or to humidify the fuel cell reactants. Exemplary oxidizer designs are described in U.S. patent Ser. Nos. 09/727,921 and 09/728,227, which are each incorporated herein by reference. Fuel cell exhaust oxidizers are sometimes referred to as "tailgas oxidizers" or "anode tailgas oxidizers" ("ATO").

Another system that may be associated with the fuel cell stack is a mechanism for measuring the voltages of the individual fuel cells within the stack. For example, the teachings of U.S. Pat. No. 6,140,820, Ser. Nos. 09/379,088, 09/629,548, 09/629,003 are each hereby incorporated by reference. In some systems, the health of a fuel cell stack may be determined by monitoring the individual differential terminal voltages (also referred to as cell voltages) of the fuel cells. Particular cell voltages may individually vary under load conditions and cell health over a range from −1 volt to +1 volt, as an example. The fuel cell stack typically may include a large number of fuel cells (between 50-100, for example), so that the terminal voltage across the entire stack is the sum of the individual fuel cell voltages at a given operating point. As the electrical load on the stack is increased, some "weak" cells may drop in voltage more quickly than others. Driving any particular cell to a low enough voltage under an electrical load can damage the cell, so systems may include a mechanism for coordinating the cell voltages with the electrical demand and reactant supply to the fuel cell stack. For example, the teachings of U.S. patent Ser. Nos. 09/749,261, 09/749,297 are hereby incorporated by reference.

A fuel cell stack typically produces direct current at a voltage which varies according to the number of cells in the stack and the operating conditions of the cells. Applications for the power generated by a fuel cell stack may demand constant voltage, or alternating current at a constant voltage and frequency similar to a municipal power grid, etc. Integrated fuel cell systems may therefore include a power conditioning system to accommodate such demands. Technologies for converting variable direct current voltages to constant or relatively constant voltages are well known, as are technologies for inverting direct currents to alternating currents. Suitable power conditioner topologies for fuel cells are also well known. For example, the teachings of U.S. patent Ser. No. 09/749,297 are hereby incorporated by reference.

A battery system may also be associated with the power conditioning system, for example, to protect the fuel cells from fuel starvation upon sudden electrical load increases on the stack. A battery system can also be used, as examples, to supplement the peak output power of the fuel cell system, or to provide continuous power to an application while the fuel cell system is temporarily shut down (as for servicing) or removed from the load. The battery system may also include a system for periodically charging the batteries when necessary.

Some fuel cell systems may be operated independently from the power grid (grid independent systems), while other fuel cell systems may be operated in conjunction with the power grid (grid parallel systems). For grid parallel systems, the system may include a transfer switch to transfer the electrical load between the fuel cell system and the power grid. For example, in some grid parallel systems, the electrical load can be switched from the fuel cell system to the grid when the fuel cell system needs to be shut down for maintenance. In still other grid parallel systems, the electrical load can be shared between the fuel cell system and the grid. The fuel cell can also be used to feed power to the grid (in this sense, the grid may be referred to as a "sink"), while an appliance takes its power from the grid. Other arrangements are possible.

System controllers may automate the operation of fuel cell systems to varying degrees, and may have varying capacities for adjustment and reconfiguration. For example, some controllers may rely in part on software for instruction sets to provide enhanced flexibility and adaptability, while other controllers may rely on hardware to provide enhanced reliability and lower cost. Control systems may also include combinations of such systems. Controllers may include an algorithm that coordinates open and closed loop functions. In this context, an open loop function is one that does not utilize feedback, such as adjusting a blower according to a look-up table without verifying the effect of the adjustment or iterating the adjustment toward a desired effect. A closed loop function is one that utilizes feedback to iterate adjustments toward a desired effect.

In general, the controller circuitry may include data inputs from system components such as safety sensors and thermocouples throughout the system. As an example, such data inputs may report data in the form of variable voltage or current signals, or as binary on/off signals. The controller circuitry may also include devices to control the voltage and/or current supplied to various components in the system, for example to control variable speed pumps and blowers. The power supplied to system components may be referred to as the parasitic load.

Figure 3:
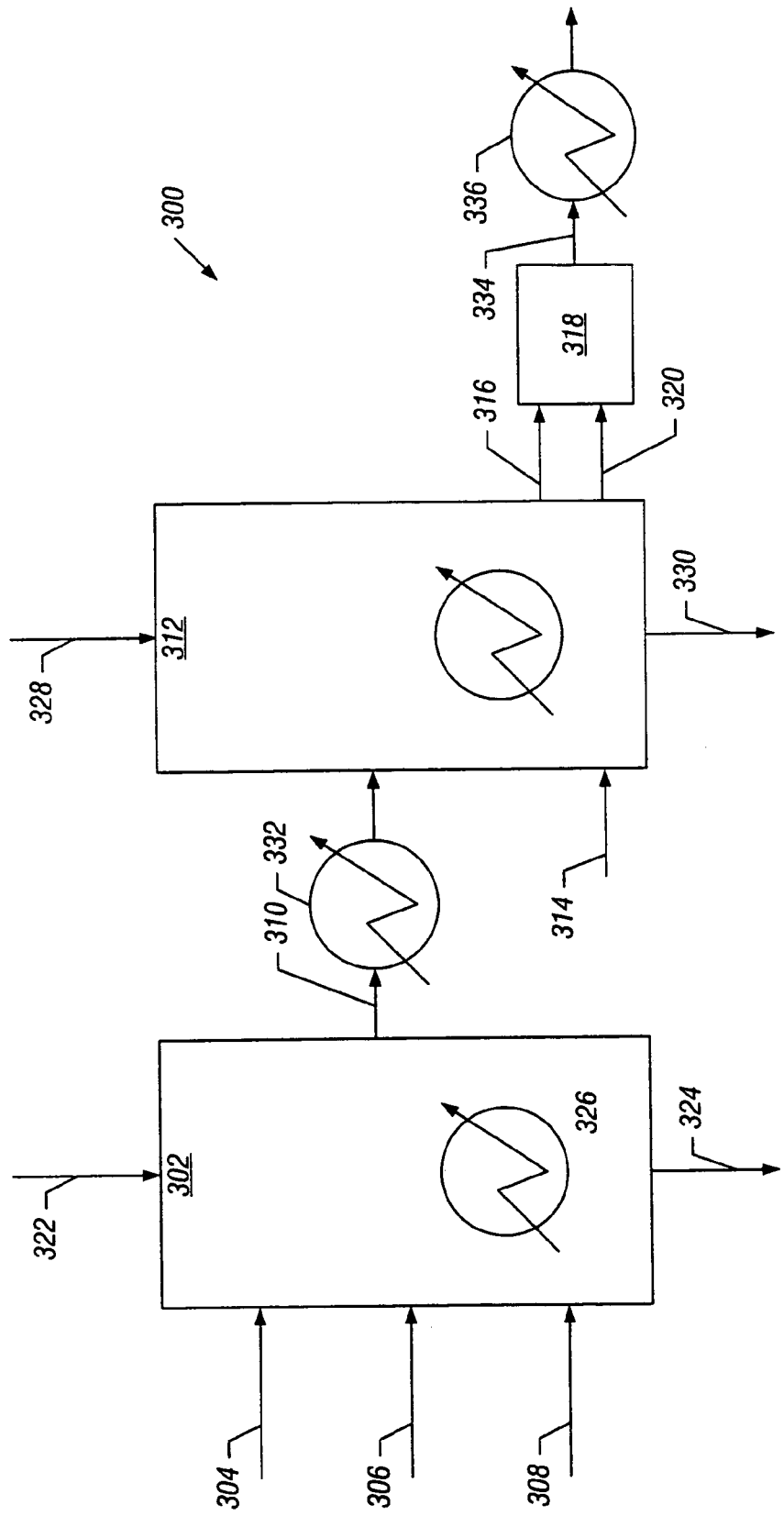
FIG. 3 is a schematic diagram of an integrated fuel cell system.

Referring to FIG. 3, a schematic diagram is shown of an integrated fuel cell system 300. A fuel processor 302 receives air 304, steam 306 and natural gas 308. Similar to the fuel processor discussed with respect to FIG. 1, the fuel processor 302 converts the reactant streams 304, 306 and 308 into a reformate stream 310 that is flowed through a fuel cell stack 312 where it reacted at the anode electrodes of the fuel cells in stack 312. The fuel cell stack 312 also receives a flow of air via conduit 314 that provides oxygen that is reacted at the cathode electrodes of the fuel cell stack 312.

The spent reformate is exhausted from fuel cell 312 via conduit 316 and is fed to oxidizer 318 to remove any carbon monoxide, hydrogen, or residual hydrocarbons in the exhaust. The oxidizer 318 is a catalytic oxidizer similar to an automotive catalytic converter. The oxidizer receives its oxygen via conduit 320, which channels the air exhausted from the fuel cell stack 312. In some embodiments, the oxidizer 318 can further receive a supplemental supply of oxygen to ensure adequate oxygen to oxidize combustibles in the fuel exhaust 316. In other embodiments, excess air stoich can be supplied to the fuel cell stack 312 to ensure that the cathode exhaust 320 has sufficient oxygen.

The system 300 includes various thermal management aspects. A coolant is circulated through the fuel processor 302 via inlet 322 and outlet 324. In this example, an outlet of a high temperature shift reactor is cooled in heat exchanger 326 from about 600° C. to about 300° C. and the reformate is then provided to a low temperature shift reactor. The reformate exits the fuel processor at a temperature of about 200° C., and is cooled in heat exchanger 332 to the operating temperature of the stack 312 (e.g., about 60-80° C.). Heat is generated as the fuel cell is operated, and the operating temperature of the stack 312 is maintained by circulating a coolant through the stack 312 via inlet 328 and outlet 330.

Heat is recovered from the exhaust 334 of the oxidizer 318 in heat exchanger 336. For example, in some embodiments, a coolant can be circulated through heat exchanger 336 to transfer heat from the oxidizer to another part of the system 300, such as to preheat the air 304 and fuel 308 streams fed to the fuel processor 302. In other embodiments, water can be flowed through heat exchanger 336 to generate steam, which is then used to humidify the air stream 314 that is fed to the fuel cell stack, or to provide the steam flow 306 that is used in the fuel processor 302.

Figure 4:
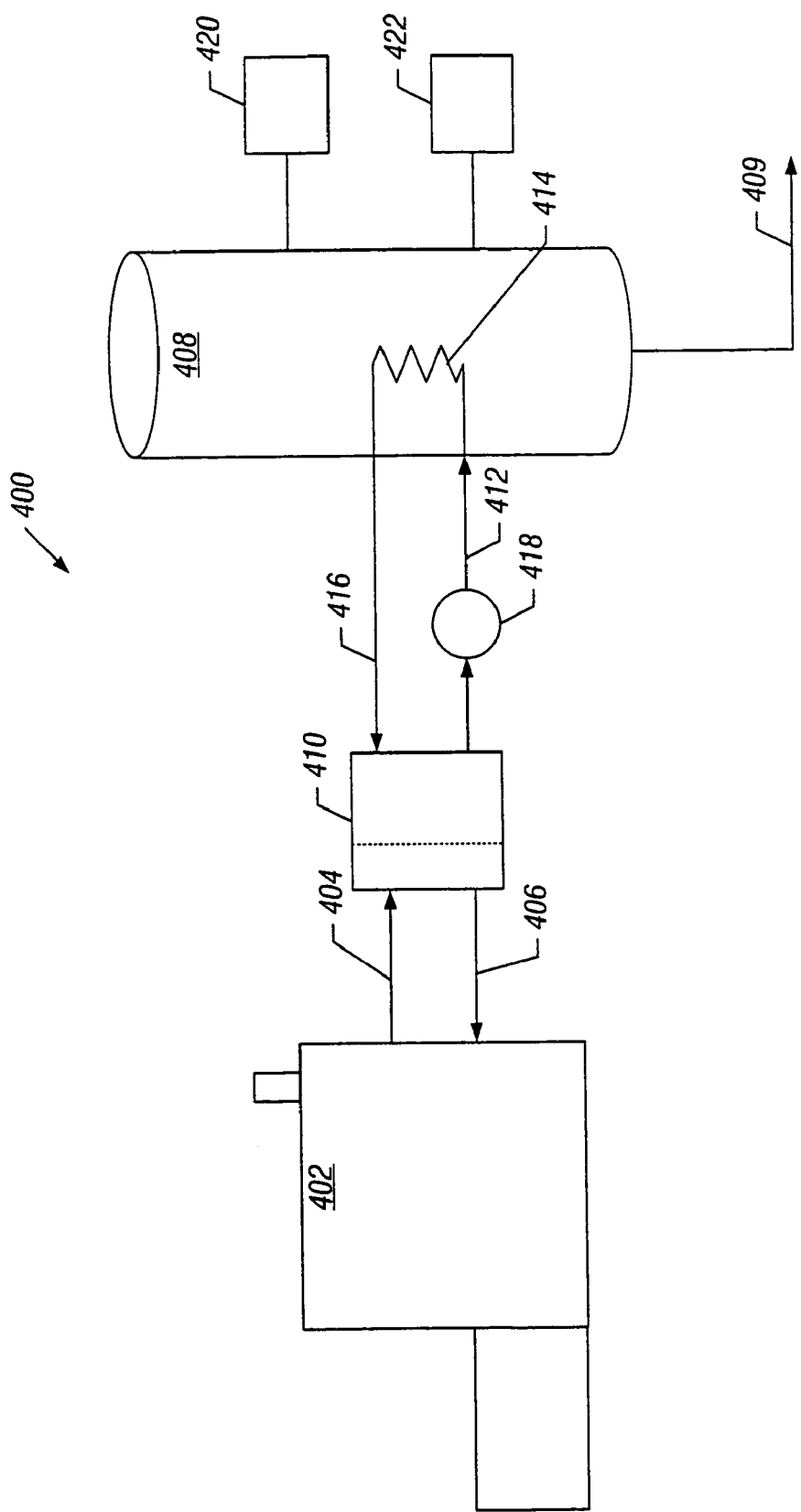
FIG. 4 is a schematic diagram of a CHP fuel cell system.

Referring to FIG. 4, a schematic diagram is shown of a CHP fuel cell system 400. A system coolant is circulated through a fuel cell system 402 to transfer heat from the fuel cell system 402 to a heat sink 408. In this example, the heat sink 408 is a hot water tank that would be used to provide hot water via conduit 409 to a building such as a home or an apartment. The coolant is circulated out of the fuel cell system 402 via conduit 404, through a heat exchanger 410, and then back into fuel cell system 402 via conduit 406. A pump inside the fuel cell system drives the coolant flow.

A coolant is also circulated from the heat exchanger 410 via conduit 412 to heat exchange surface 414 in heat sink 408, and then back to heat exchanger 410 via conduit 416. The coolant flow is driven by pump 418. In some embodiments, the heat exchanger 410 can be located in heat sink 408 such that a single coolant loop is circulated between fuel cell system 402 and heat sink 408. However, the embodiment shown provides an advantage in that the equipment associated with the heat sink can be configured independently form the fuel cell system 402.

For example, the heat sink 408 also includes a level sensor 420 and a temperature sensor 422 (e.g., a thermostat). The level sensor 420 serves to ensure that the water level in tank 408 stays above a predetermined threshold. For example, a valve can be actuated to allow a tap water line to fill the tank 408 to make up for water flowed out of the tank 408 via conduit 409. The temperature sensor 422 serves to ensure that the temperature of the water in tank 408 stays above a desired level.

The temperature sensor 422 can be connected to a controller that is further connected to pump 418. As an example, where the temperature sensor 422 indicates heat is needed to bring the temperature of the tank 408 to a desired level, the pump 418 can be turned on to transfer heat from the heat exchanger 410 to the tank 408. Where no heat is needed in the tank, the pump 418 can remain off such that no heat is transferred from the heat exchanger 410 to the tank 408. In such a case, the fuel cell system 402 may continue to circulate coolant through the heat exchanger 410, but may also operate a radiator in the fuel cell system 402 to expel heat to ambient to maintain the operating temperatures (e.g., the coolant temperature) in the fuel cell system 402 at desired levels.

In some embodiments, the heat exchanger 410 can be located within the fuel cell system 402. For example, the fuel cell system 402 can include an inlet and an outlet hook-up for a heat sink such as a water tank. The flow through this circuit can be provided by a pump in the fuel cell system, or by a pump at the heat sink location. It will be appreciated that many variations are possible.

Figure 5:
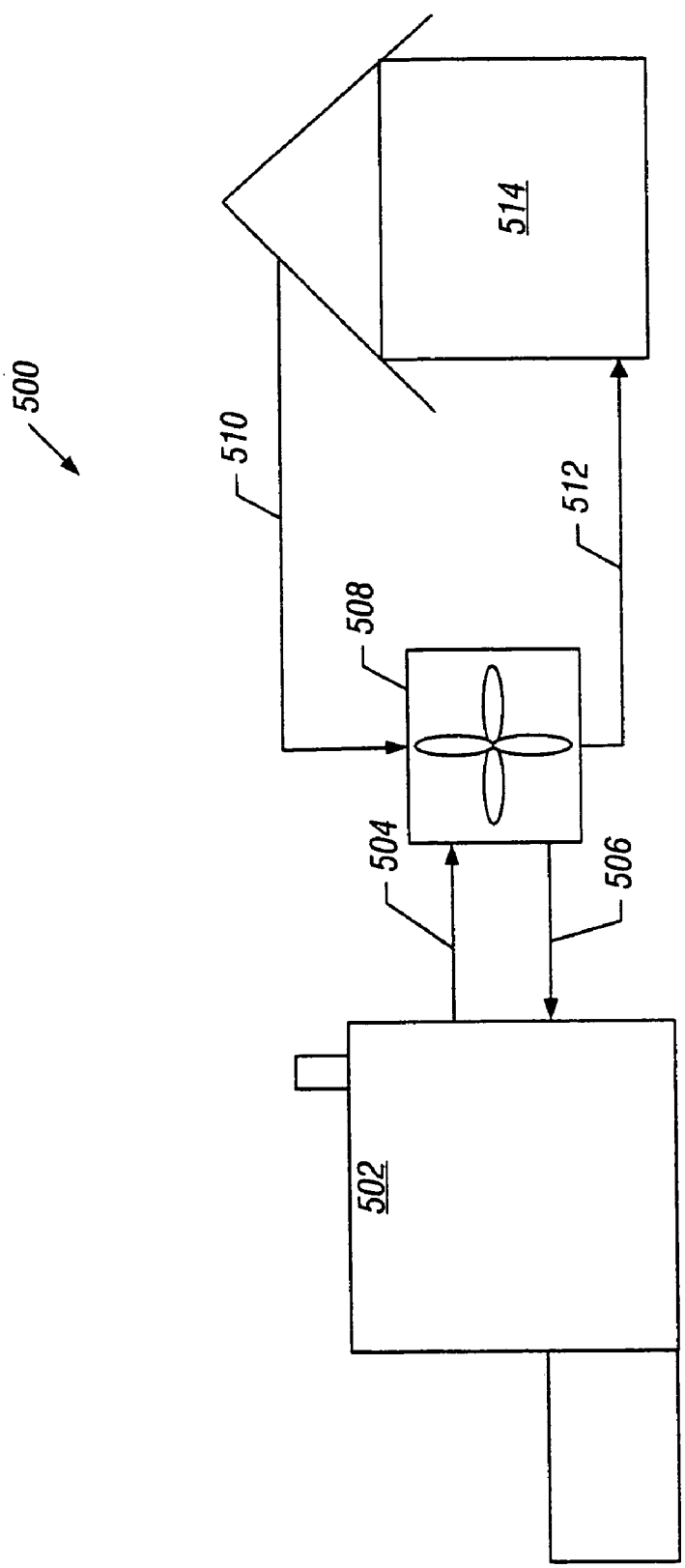
FIG. 5 is a schematic diagram of a CHP fuel cell system.

Referring to FIG. 5, a schematic diagram is shown of another example of a CHP fuel cell system 500. A coolant is circulated between a fuel cell system 502 and a radiator 508 to maintain the operating temperatures (e.g., the coolant temperature) in the fuel cell system 502 at desired levels. The coolant flows from the fuel cell system 502 to the radiator 508 via conduit 504 and returns from the radiator 508 to the fuel cell system 502 via conduit 506. A blower 509 is associated with the radiator 508 that is actuated to cool the coolant flowed through the radiator 508 by blowing a relatively cool fluid across the radiator 508. In this example, the blower is used to flow cold air from building 514 via conduit 512 across the radiator 508, where the air is heated and is then flowed back to building 514 via conduit 512. The blower 509 may be actuated, as an example, by a thermostat located in building 514. The radiator 508 may also include a second blower to reject radiator heat to ambient to maintain a desired operating temperature of the fuel cell system 502 when heat is not required by the building 514. This example illustrates another means by which fuel cell system heat can be provided to a heat sink. It will be appreciated that while the heat sink in this example is generally the building 514, it could also be defined in terms of the radiator 508 as a matter of perspective.

In one aspect of the invention, an integrated fuel cell system includes a fuel processor, a fuel cell stack, a power conditioning system, and a control scheme adapted to coordinate the operation of these systems with at least one heat sink and at least one power sink. The terms "integrated fuel cell system" and "fuel cell system" are used interchangeably, and generally refer to a fuel cell stack that is coupled to components and subsystems that support the operation of the stack and the application of power generated by the stack. The term combined heat and power ("CHP") fuel cell system refers to a fuel cell system that is used to provide both power and the utilization of waste heat. For example, a fuel cell can be used to produce electricity, and waste heat from the fuel cell system can be used for various applications where heat is needed (e.g., adsorption coolers, water heaters, boilers, furnaces, etc.) to reduce the fuel or electricity ordinarily required by such applications. Such systems are also sometimes referred to as "co-generation" or "co-gen" systems. The utilization of waste heat can dramatically increase the efficiency of such systems.

The fuel processor includes a first coolant system wherein heat from exothermic reactions within the fuel processor is transferred to a coolant fluid to maintain a desired temperature in at least a portion of the fuel processor. The coolant system may be adapted to simultaneously maintain various different temperatures within the fuel processor, for example, by varying coolant flow, heat transfer surface area, and reactant flow within the fuel processor associated with a given heat exchanger. As an example, the coolant fluid may be glycol-based, such as propylene glycol. Exemplary fuel processor systems are described in U.S. Pat. Nos. 6,207,122, 6,190,623, and 6,132,689, the teachings of which are each hereby incorporated herein by reference.

Suitable fuel cell stack designs are well known. For example, the fuel cell systems taught in U.S. Pat. Nos. 5,858,569, 5,981,098, 5,998,054, 6,001,502, 6,071,635, 6,174,616, and Ser. No. 09/502,886 are each hereby incorporated by reference. A fuel cell stack may also be incorporated that is based on a "high temperature" PEM, such as the polybenzimidazole ("PBI") fuel cell membranes manufactured by Celanese. U.S. patents describing this material include U.S. Pat. Nos. 5,525,436, 6,099,988, 5,599,639, and 6,124,060, which are each incorporated herein by reference. In this context, "high temperature" PEM's generally refer to PEM's that are operated at temperatures over 100° C. (e.g., 150-200° C.). Stacks based on other high temperature membrane materials such as polyether ether ketone ("PEEK") may also be suitable.

The stack includes a second coolant system that is adapted to maintain a desired operating temperature of the stack. As an example, a coolant fluid may be circulated through coolant channels between each fuel cell in the stack. It is generally desirable that a coolant flowing through the stack be substantially dielectric to prevent the coolant from shorting the fuel cells in the stack. This issue may also be addressed in other ways, for example, by electrically isolating the coolant as it flows through the stack. As examples, the coolant can be deionized water or glycol. In some cases, the first coolant system associated with the fuel processor may be the same as the second coolant system associated with the stack. For example, a common fluid may be flowed through both systems. In other cases, the coolant systems may be distinct, and may contain different coolant fluids. For example, a coolant such as glycol with a relatively high boiling point may be used in the fuel processor, whereas a coolant with a relatively low boiling point such as water may be used in the fuel cell stack.

A third coolant system may be associated with an oxidizing unit that is adapted to oxidize combustible components in the fuel cell exhaust such as hydrogen and unreacted hydrocarbons before the exhaust is vented to the atmosphere. As an example, such an oxidizing unit may resemble an automotive catalytic converter unit and be maintained at a temperature over 600° C. Maintaining the oxidizer temperature may require sinking a substantial amount of heat from the exothermic oxidation into the third coolant system, depending on factors such as the level of excess hydrogen that is fed to the fuel cell stack, the amount of residual hydrocarbons in the fuel cell exhaust and the amount of air that is supplied to oxidize these components. In some cases, the third coolant system may be a portion of the first or second coolant systems.

A fuel cell stack typically produces direct current at a voltage which varies according to the number of cells in the stack and the operating conditions of the cells. Applications for the power generated by a fuel cell stack may demand constant voltage, or alternating current at a constant voltage and frequency similar to a municipal power grid, etc. Integrated fuel cell systems as in the present invention may therefore include a power conditioning system to accommodate such demands. Technologies for converting variable direct current voltages to constant or relatively constant voltages are well known, as are technologies for inverting direct currents to alternating currents. Suitable power conditioner topologies for fuel cells are also well known. For example, the teachings of U.S. patent Ser. No. 09/471,759 are hereby incorporated by reference.

A battery system may also be associated with the power conditioning system, for example, to protect the fuel cells from fuel starvation upon sudden electrical load increases on the stack. A battery system can also be used, as examples, to supplement the peak output power of the fuel cell system, or to provide continuous power to an application while the fuel cell system is temporarily shut down (as for servicing) or removed from the load. The battery system may also include a system for periodically charging the batteries when necessary.

Some fuel cell systems may be operated independently from the power grid (grid independent systems), while other fuel cell systems may be operated in conjunction with the power grid (grid parallel systems). For grid parallel systems, the system may include a transfer switch to transfer the electrical load between the fuel cell system and the power grid. For example, in some grid parallel systems, the electrical load can be switched from the fuel cell system to the grid when the fuel cell system needs to be shut down for maintenance. In still other grid parallel systems, the electrical load can be shared between the fuel cell system and the grid. Other arrangements are possible.

The heat sink of the present system is a media to which heat from any of the above described coolant systems is transferred. In some systems having multiple distinct coolant loops, heat from one coolant loop may be transferred to another coolant loop having a lower temperature by way of a liquid-to-liquid heat exchanger. Thus, the heat sink may receive heat from throughout the fuel cell system while directly contacting only one of the coolant loops. In other embodiments, each coolant loop may be associated with a heat sink. In still other embodiments, each coolant loop can be associated with multiple heat sinks.

In some systems, the coolants are flowed through an air-cooled radiator, such that heat from the fuel cell system is transferred to the air around the fuel cell system. In this example, the radiator is the heat sink. In other embodiments, the heat sink can be a liquid-to-liquid heat exchanger, for example to exchange heat from a liquid fuel cell system coolant to a hot water tank or to an external fluid loop transferring heat to a hot water tank. The fuel cell system coolant can also be in vapor form as it contacts a heat sink. In such cases, in some embodiments the heat sink can serve as a condenser of the vaporized coolant. Also, in some embodiments, the temperatures of fuel cell system components can be regulated by direct interaction with heat sinks rather than by passing heat to a coolant loop and then to the heat sink. The present invention contemplates that heat from the fuel cell system can be transferred to a number of applications where heat is desired, including domestic and commercial hot water tanks, and air cooled radiators that supply heat to buildings or other applications.

The various sources of heat within the fuel cell system may differ in terms of temperature and amount of heat. For example, fuel cells are generally operated at temperatures much lower than fuel processors, such that the temperature of the waste heat from a fuel cell stack is generally lower than that of the waste heat from a fuel processor.

Waste heat at relatively lower temperatures is sometimes referred to as "lower grade" heat, whereas waste heat at relatively higher temperatures can be referred to as "higher grade" heat. This is due to the fact that heat transfer efficiency is generally greater when heat is transferred across relatively large temperature differences. Likewise, it is generally less efficient to transfer heat between masses having a relatively small temperature difference. Thus, the applicability of a particular waste heat stream for heat recovery may vary according to the temperature and mass flow of the waste heat stream, and according to the temperature and mass (or mass flow) into which the waste heat is transferred.

A power sink of the present invention may be any application to which the power generated by the fuel cell stack is sent. For example, the fuel cell system may be used to power residential appliances (e.g., 110 VAC, 60 Hz). The fuel cell system may also be used to feed power to a utility grid. Other applications may require direct current power from the fuel cell system. Finally, the "parasitic load" of any or all of the electric components within the fuel cell system (e.g., valves, pumps, blowers, controllers, etc.) can also represent a power sink for the fuel cell system.

System controllers may automate the operation of fuel cell system components to varying degrees, and may have varying capacities for adjustment and reconfiguration. For example, some controllers may rely in part on software for instruction sets to provide enhanced flexibility and adaptability, while other controllers may rely on hardware to provide enhanced reliability and lower cost. Control systems may also include combinations of such systems. Controllers may include an algorithm that coordinates open and closed loop functions. In this context, an open loop function is one that does not utilize feedback, such as adjusting a blower according to a look-up table without verifying the effect of the adjustment or iterating the adjustment toward a desired effect. A closed loop function is one that utilizes feedback to iterate adjustments toward a desired effect.

In general, the controller circuitry may include data inputs from system components such as safety sensors and thermocouples throughout the system. As an example, such data inputs may report data in the form of variable voltage or current signals, or as binary on/off signals. The controller circuitry may also include devices to control the voltage and/or current supplied to various components in the system, for example to control variable speed pumps and blowers. In general, the logic employed by a system controller may be referred to as a control scheme. In some cases, fuel cell systems can include multiple independent controllers and control schemes, that may or may not be coordinated by a common controller or control scheme.

In one aspect of the invention, a control scheme is provided for a combined heat and power fuel cell system that coordinates control of the system between a heat sink and a power sink. For example, if the power sink is a set of residential appliances and the heat sink is a hot water heater for the residence, the demand for power may be independent from the demand for hot water. However, the amount of power and waste heat available from the system are linked because the waste heat is a by-product of operating the system to produce power. Still, there may be situations where power is required, but little or no heat is needed, or vice versa. There is thus a need to efficiently coordinate and balance the operation of the system between such demands.

In one embodiment, the hydrogen stoich is adjusted to meet a given power demand. The hydrogen stoich may be minimized such that no more hydrogen is supplied to the fuel cell stack than is required to meet the electrical load. For example, the teachings of U.S. patent Ser. No. 09/749,298 are hereby incorporated by reference. Minimizing the hydrogen stoich in this way increases the efficiency of the system (without respect to efficiency gains from waste heat recovery). When hydrogen stoich is supplied in excess of what is needed to meet the electrical load on the fuel cells, the excess hydrogen simply passes through the stack unreacted and is oxidized in the ATO. Thus, under one embodiment of the present invention, when there is no heat demand (e.g., from a thermostat on a hot water heater), the system provides only enough hydrogen stoich to meet the electrical load on the system. When heat is demanded from the system, the hydrogen stoich is increased so that excess hydrogen is provided to the ATO, which generates heat that is transferred to the heat sink. The heat demand signal can be binary (on/off), or it can be dynamic to increase the heat output to a desired level.

Figure 6:
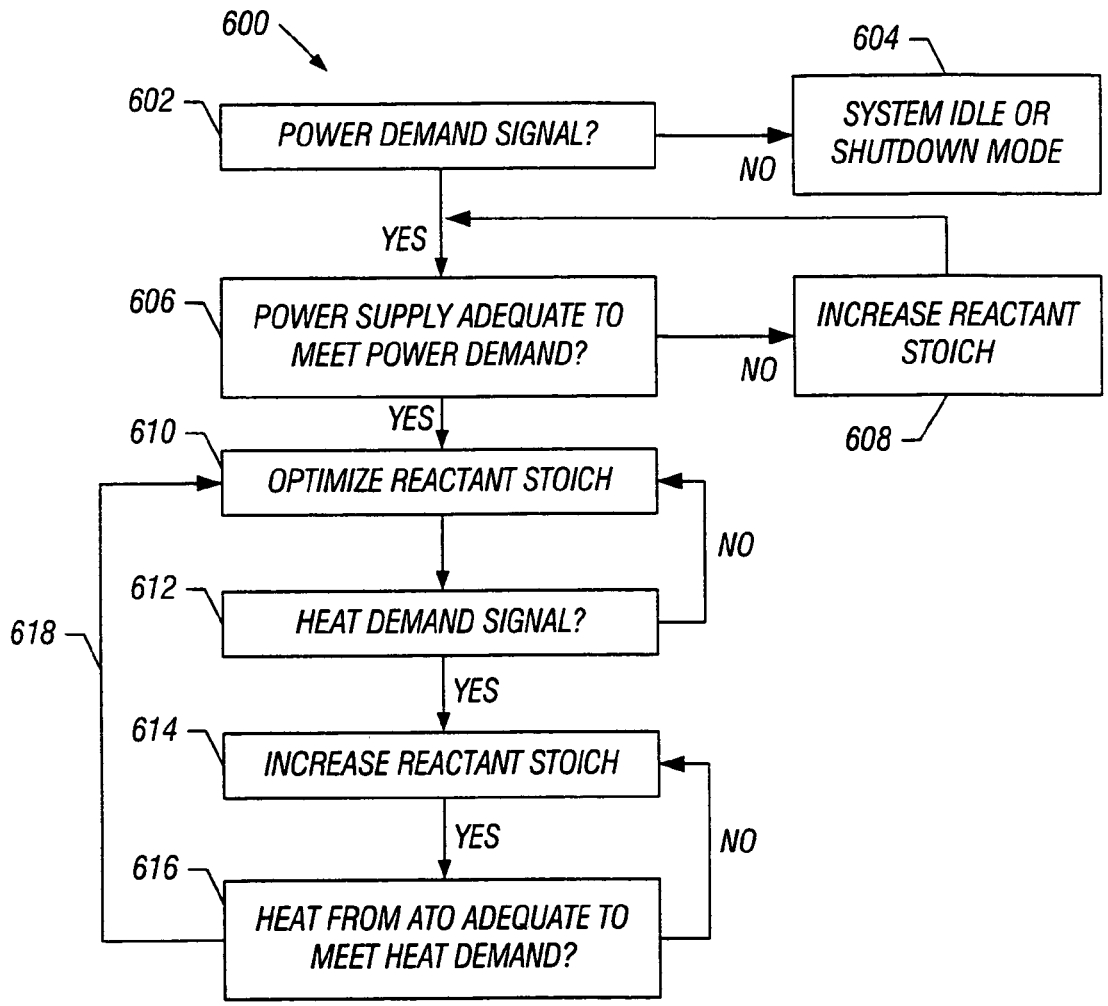
FIG. 6 is a flow diagram of a control scheme for a CHP fuel cell system.

As an example, referring to FIG. 6, a flow diagram is shown of a control scheme 600 for a CHP fuel cell system. In a first step 602, the system determines if there is a power demand signal indicating an electrical load on the fuel cell system. If there is no power demand signal, then the system maintains an idle function 604 an continues checking for a power demand signal. In the event of a power demand signal, the system then determines in a step 606 whether the power output of the fuel cell system is adequate to meet the electrical load placed on the system. If the power output is not adequate, then the reactant flow rates are incrementally increased in step 608 and the system returns to step 606. If the power output is adequate, the system enters a stoich optimization mode 610. The stoich optimization mode 610 can include, for example, reducing the fuel flow to the fuel cell until the voltage or some other performance parameter of the fuel cell (or of the weakest cell in a stack) is affected to an unacceptable extent. For example, to avoid damaging the fuel cell stack from reactant starvation, it may be desirable to monitor all of the cell voltages in the stack, and to maintain reactant flow rates high enough to prevent any of the cells from dropping below 0.4 volts. In some embodiments, excess air flow is maintained such that only the flow of the fuel is modulated by the algorithm 600.

The system also performs a check 612 for a heat demand signal. For example, the heat demand signal could be a thermostat indicating that a water tank is below a desired temperature. In the example shown in FIG. 6, the fuel cell system heat used to supply the heat in response to a heat demand signal is supplied primarily from an oxidizer unit (see heat exchanger 336 of FIG. 3). If there is no heat demand signal, the system continues in optimization mode 610. Where there is a heat demand signal, the system then performs an increase 614 in the reactant flow rates. For example, in this example, for a constant power demand, increasing the fuel flow rate will increase the amount of unreacted fuel in the fuel cell exhaust that is processed in the oxidizer to generate heat.

In the next step 616, the system checks whether the heat being supplied by the system to the heat sink is adequate to meet the demand for heat. For example, step 616 could include, as examples, calculating whether enough heat will be made available in a desired amount of time at a given operating point, or it can include supplying heat at a given operating point for a period of time and then checking again whether the desired amount of heat has been supplied. If not enough heat has been supplied, then the system further increases the flow rates of the reactants. If the heat demand has been met, the system returns 618 to its optimization mode. It will be appreciated that the system is continually looking for power or heat demand signals by repeatedly cycling through these determinations. Some embodiments may eliminate the determination 616 and simply continue producing a heat demand signal while heat is needed.

In another embodiment, the hydrogen stoich is similarly minimized such that no more hydrogen is supplied to the fuel cell stack than is required to meet the electrical load. When heat is required from the system, a heat demand signal causes raw hydrocarbon (e.g., natural gas or propane) to bypass the fuel processor so that it is oxidized in the ATO to provide the desired heat. The heat demand signal can be binary (on/off), or it can be dynamic to increase the heat output to a desired level.

Figure 7:
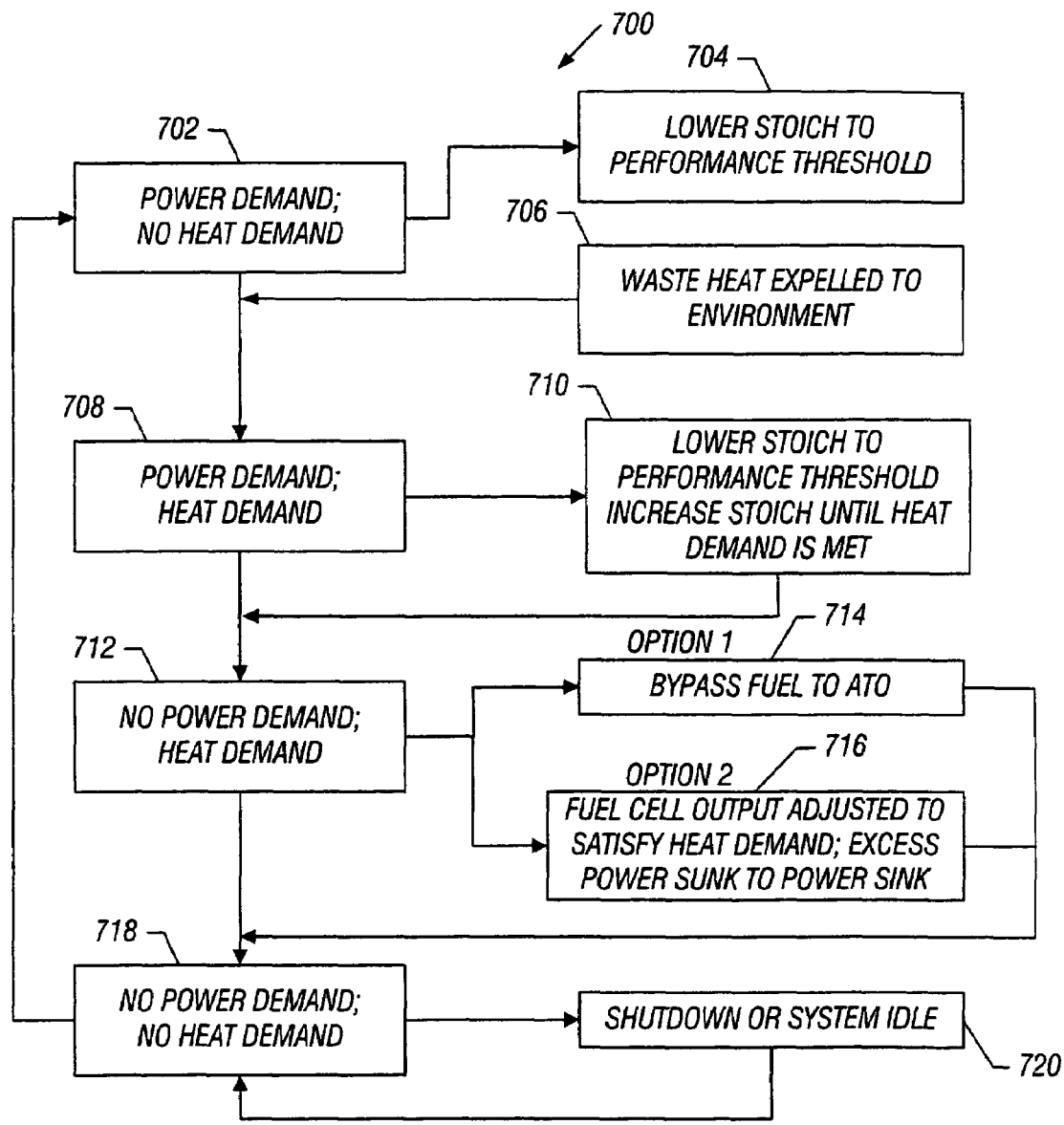
FIG. 7 is a flow diagram of a control scheme for a CHP fuel cell system.

Referring to FIG. 7, another flow diagram 700 is shown of a control scheme for a CHP fuel cell system to illustrate various logical options that may be implemented by a system to balance a combination of heat and power demand signals. In a first state 702, there is a power demand, but no heat demand. In response, the system lowers the reactant flow rates in step 704 to a point where the power demand can still be met. Step 704 serves to maximize fuel efficiency. In this mode, the system also exhausts its waste heat to ambient in a step 706 (e.g., the environment outside the fuel cell system, or to the atmosphere).

In a second state 708, there is both a power demand and a heat demand. In this state 708, the system increases reactant flow rates in a step 710 until the power and heat demands are both met. It will be appreciated that the power demand will be met first, and the heat demand will then be met as the excess reactants reach a point where the energy produced by oxidizing the excess fuel is sufficient to meet the heat demand.

In a third state 712, there Is no power demand, but there is a heat demand. In this state 712, the system can be configured to select between two options. In a first response option 714, the fuel cell system is maintained at a constant power output (or an output that directly tracks an electrical load), and fuel is bypassed from the fuel processor directly to the oxidizer to produce the heat required. In some cases, it may be desirable to continue operating the fuel processor and to instead bypass the reformate from the fuel cell stack to the oxidizer. In a second response option under state 712, the system operates the fuel cell at a power output sufficient to provide enough waste heat to meet the heat demand. The excess power produced is then put into a power sink, such as in charging a battery system or supplying power to a utility grid.

In a fourth state 718, there is no power demand and no heat demand. In this example, the system responds in step 720 by idling, meaning that the system operates at just a high enough power output to maintain readiness for general operation. The power produced is sent to a power sink.

In another embodiment, the heat sink receives at least a portion of its heat from the fuel cell stack (e.g., from a coolant circulated through the stack and contacted with the heat sink). In this embodiment, the system responds to a heat demand signal (e.g., from a thermostat on a hot water heater) by shorting at least one fuel cell within the fuel cell stack. For example, the teachings of U.S. patent Ser. No. 09/428,714 are hereby incorporated by reference. When a fuel cell is shorted, its electrical potential is driven to zero and all power generated in the cell is in the form of heat. Essentially, the shorted cell is converted into a resistive heater. In this way, additional heat can be supplied by the fuel cell system for a given power output of the fuel cell stack.

Figure 8:
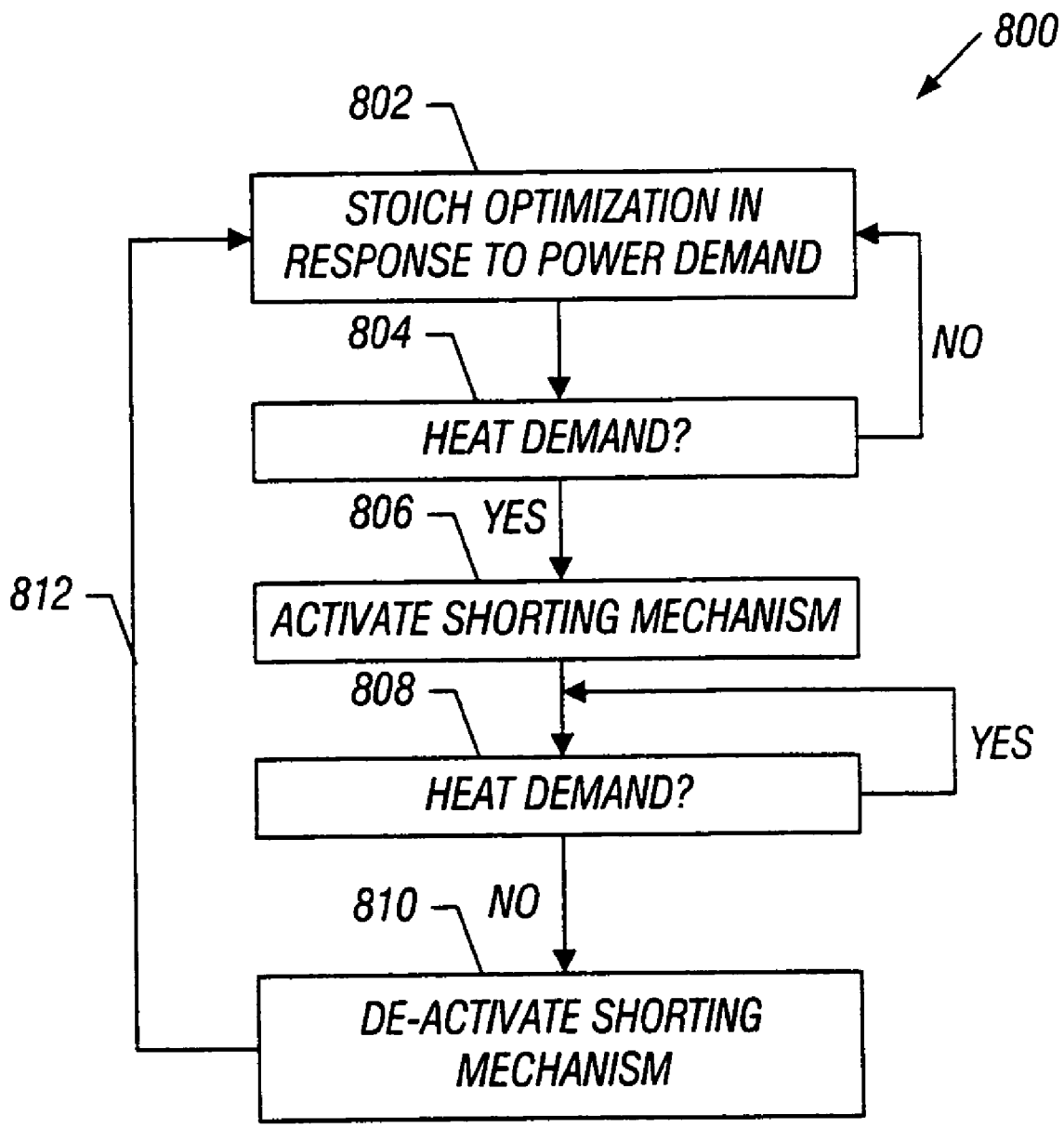
FIG. 8 is a flow diagram of a control scheme for a CHP fuel cell system.

For example, referring to FIG. 8, a flow diagram 800 is shown of a control scheme for a CHP fuel cell system. This method of operation contains the following logical steps: (802) operating the system at a reactant stoichiometry optimized according to the power demand; (804) checking for a heat demand signal; (806) shorting at lest one fuel cell when there is a heat demand signal; (808) checking whether the heat demand has been met; (810) deactivating the cell shorting mechanism when the heat demand has been met; and returning to step (802) to repeat the steps (802)-(810).

Such a control scheme may also include a step where the hydrogen stoich is minimized with respect to the electrical load, and a step where the reformer output to the fuel cell stack is increased over what would normally be supplied for a given electrical load to compensate for the loss of power production of any cells that are shorted. Similarly, an additional step in the control logic may be provided where the power conditioning system compensates for the reduction in voltage from the stack resulting from having some cells shorted (e.g., a DC to DC conversion operation is modified to provide a higher voltage to a DC to AC inverter). In some systems, the power conditioning components may tolerate a range of input voltages such that such a step is unnecessary (e.g., a voltage tolerant or multi-voltage inverter).

Such a control scheme may also include a step where the operating conditions of the un-shorted cells are adapted to optimize the current density and/or voltage of the un-shorted cells. For example, it is well understood in the art that a fuel cell voltage and current density can be manipulated according to the electrical load on the cell and the reactant conditions and stoichiometry provided. For example, the teachings of U.S. patent Ser. No. 09/471,759 (referenced above) include the use of a battery system coupled with a dynamic current limiting device to supply constant power to an electrical load while controlling the portion of the load that is placed on the fuel cell stack.

In another embodiment, the heat sink also receives at least a portion of its heat from the fuel cell stack. The fuel cells in the system are divided into at least two sections of cells connected in series. In a first operating mode, the sections of cells are connected in series, and in a second operating mode, at least two sections of cells are operated in parallel. In general, the first and second operating modes will provide different operating efficiencies in terms of the amount of heat produced per unit power. For example, the second operating mode may produce more heat. In such an embodiment, a heat demand signal may result in the system switching to the operating mode providing the most heat for the amount of power produced. Such embodiments may include the use of a power conditioning system capable of accommodating the differing voltages associated with each operating mode.

In another embodiment, the heat sink also receives at least a portion of its heat from the fuel cell stack. In this embodiment, to vary the amount of heat that is produced by the fuel cell stack for a given power output, the reactant stoichiometry is reduced until the respective voltages of the fuel cells in the stack are reduced to a point where the stack begins producing more heat with respect to the amount of power produced. Such embodiments may include the use of a power conditioning system capable of accommodating the resulting variation in stack voltage. Also, such embodiments may include the use of MEA's in the stack that are tolerant to reactant starvation under load. For example, the teachings of U.S. patent Ser. No. 09/727,748 are hereby incorporated by reference.

Figure 9:
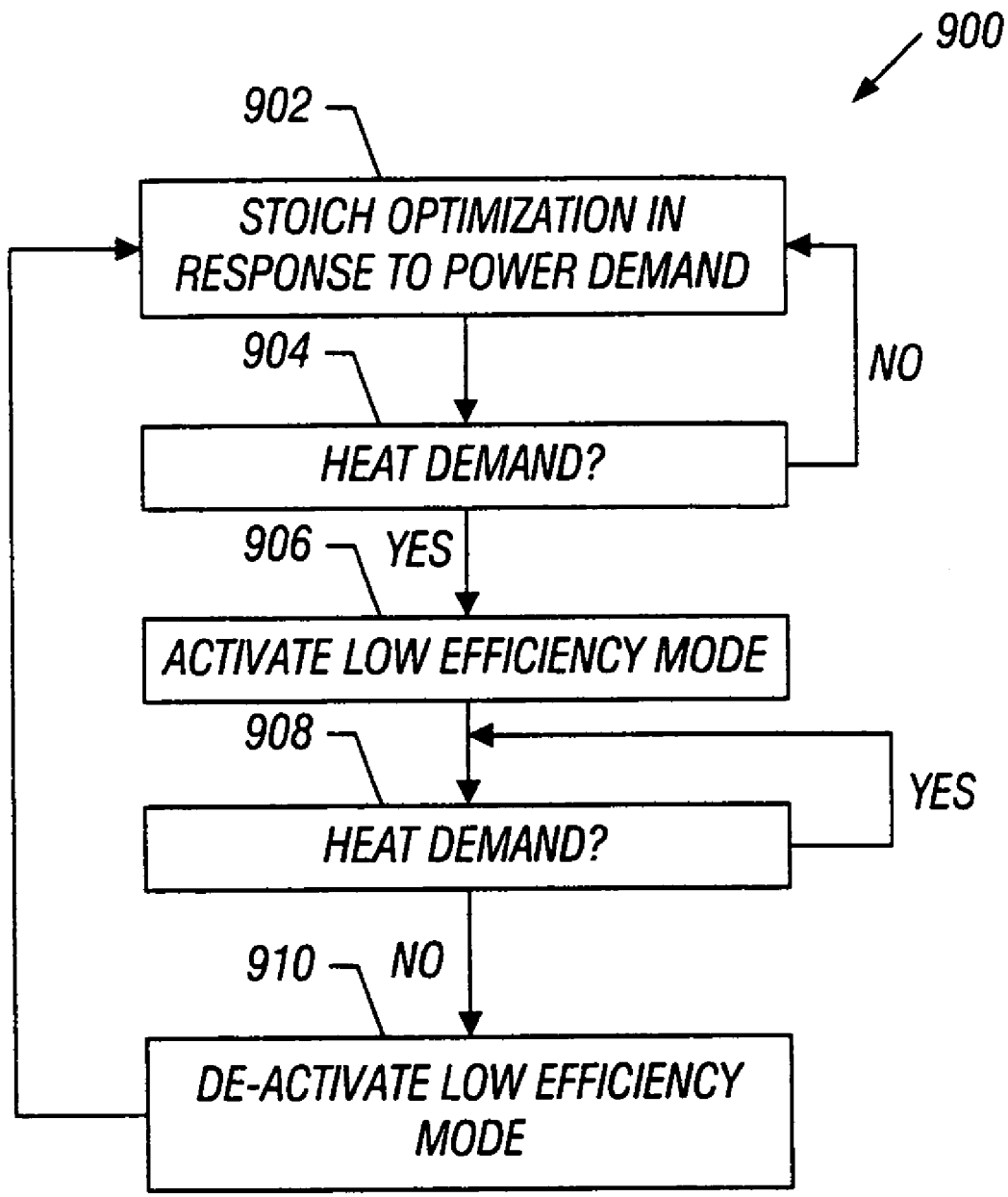
FIG. 9 is a flow diagram of a control scheme for a CHP fuel cell system.

Referring to FIG. 9, a flow diagram is shown of a control scheme for a CHP fuel cell system. This method of operation contains the following logical steps: (902) operating the system at a reactant stoichiometry optimized according to the power demand; (904) checking for a heat demand signal; (906) activating a low efficiency operating mode where waste heat is increased for a given power output; (908) checking whether the heat demand has been met; (910) deactivating the low efficiency operating mode when the heat demand has been met; and returning to step (902) to repeat the steps (902)-(910).

In another aspect, the invention provides a control apparatus for executing any of the above logic schemes for coordinating the power and heat output of a fuel cell system. Techniques for preparing circuitry to provide electronic control systems are well known in the art, such that a system under the present invention with the features and aspects described above could be implemented by one of ordinary skill, for example by reference in part to the patents mentioned above.

In another aspect of the invention, a method is provided for enabling a fuel cell system to accommodate variable demands for heat and power output. In one embodiment, the method includes providing excess fuel to the fuel cell system in response to a control signal (e.g., a heat demand signal as from a thermostat) such that the excess unreacted fuel is burned in a fuel cell exhaust oxidizer to produce heat. In another embodiment, the method includes shorting at least one fuel cell within the fuel cell stack in response to a control signal to provide additional heat into a fuel cell stack coolant fluid. In another embodiment, the method may include selectively electrically connecting fuel cells in a low efficiency mode (e.g., some cells in parallel rather than in series) in response to a control signal (e.g., a heat demand signal as from a thermostat) to provide additional heat into a fuel cell stack coolant fluid. In another embodiment, the method may include selectively fuel starving a fuel cell under load to an operating point providing a desired balance between power and heat production of the fuel cell. In each of these embodiments, the method may further include flowing or selectively flowing a fuel cell system coolant to a heat sink to transfer fuel cell system waste heat to a heat sink.

In another aspect of the invention, an integrated fuel cell system is provided that is coupled to a power sink and a heat sink. A controller of the fuel cell system is adapted to respond to data signals from the power sink and the heat sink. For example, such data signals from the heat sink may include a temperature indication or a heat demand signal (such as from a thermostat). Such data signals from the power sink may include a voltage or current measurement, an electrical power demand signal, or an electrical load.

In one embodiment, the controller is adapted to provide excess fuel to the fuel cell system in response to a control signal (e.g., a heat demand signal as from a thermostat) such that the excess unreacted fuel is burned in a fuel cell exhaust oxidizer to produce heat. In another embodiment, the controller is adapted to activate a mechanism to short at least one fuel cell within the fuel cell stack to provide additional heat into a fuel cell stack coolant fluid. In another embodiment, the controller is adapted to selectively electrically connect fuel cells in a low efficiency mode (e.g., some cells in parallel rather than in series) to provide additional heat into a fuel cell stack coolant fluid. In another embodiment, the controller is adapted to selectively fuel starve a fuel cell under load to an operating point providing a desired balance between power and heat production of the fuel cell. In each of these embodiments, the controller may be further adapted to direct a fuel cell system coolant to a heat sink to transfer fuel cell system waste heat to a heat sink.

In another embodiment of the invention, an article of manufacture is provided that includes at least one computer usable medium having computer readable code embodied thereon for enabling the coordination of heat demand and power demand signals in the operation of an integrated CHP fuel cell system. For example, such code may implement any of the logic operations and functions described above, by themselves or in combination.

In another embodiment, the invention provides at least one program storage device readable by a machine, tangibly embodying at least one program of instructions executable by the machine to perform a method for enabling a fuel cell system to accommodate simultaneous variable demands for heat and power output, including any of the features described above, by themselves or in combination.

In another embodiment, a fuel cell system is provided that includes a fuel cell stack and a first coolant circuit. The first coolant circuit is adapted to circulate a first coolant through the fuel cell stack and transfer heat from the fuel cell stack to a heat sink. As previously discussed, the heat sink can be any medium or object that heat is transferred to. In some embodiments, the heat sink is a hot water tank. In other embodiments, the heat sink is a body of air in a building. In still other embodiments, the heat sink is a generator portion of an adsorption cooling system. Other heat sink applications are possible.

A second heat source such as a fuel processor or an exhaust gas oxidizer is present in the system and a second coolant circuit is adapted to circulate a second coolant through the second heat source to transfer heat from the second heat source to the heat sink. A controller is connected to a first pump and adapted to vary an output of the first pump, wherein the first pump is located in the first coolant circuit to drive the first coolant flow. A second pump is also connected to the controller, which is adapted to vary an output of the second pump, and wherein the second pump is located in the second coolant circuit to drive the second coolant flow. As examples, the controller can be adapted to maintain a temperature of the fuel cell stack above or below a predetermined level, or to maintain a temperature of the second heat source above or below a predetermined level.

In some embodiments, the heat sink is a heat exchanger including a first flow path adapted to receive a flow of the first coolant, a second flow path adapted to receive a flow of the second coolant; and a third flow path adapted to receive a flow of a third fluid. For example, the heat exchanger could receive cold water as the third fluid. In one portion of the heat exchanger, the water receives heat from the first fluid (e.g., fuel cell coolant) and in a second portion of the heat exchanger, the water receives additional heat from the second fluid (e.g., fuel processor or oxidizer coolant that is at a higher temperature than the first fluid). The heated water (i.e., heat sink) is then flowed to its application, in this case a hot water tank.

Preferably, at least one of the first and second coolant circuits include a radiator having a variable speed radiator fan. The radiator allows the system to expel heat to ambient when the heat is not needed by the heat sink. In some embodiments, a heat demand sensor is connected to the controller and adapted to vary a speed of the radiator fan to maintain a temperature of the heat sink above a predetermined level.

The system can further include a third heat source and a third coolant circuit, wherein the third coolant circuit is adapted to circulate a third coolant through the third heat source to transfer heat from the second heat source to the heat sink. A third pump is also connected to the controller, which is adapted to vary an output of the third pump. As an example, the second heat source can be a fuel processing reactor, and the third heat source is a system exhaust gas oxidizer, such that heat is transferred from both subsystems to the heat sink.

In another aspect, the invention provides a method of operating a fuel cell system, including the following steps: (1) transferring heat from a fuel cell to a first coolant circuit; (2) transferring heat from a second system heat source to a second coolant circuit; (3) transferring heat from each of the first and second coolant circuits to a heat sink; (4) varying a first coolant flow through the first coolant circuit to maintain a temperature of the fuel cell below a predetermined level; and (5) varying a second coolant flow through the second coolant circuit to maintain the second system heat source below a predetermined level. Such methods can further comprise selectively flowing at least one of the first coolant and second coolant through a radiator; and operating a fan to blow air across the radiator to remove heat from the radiator.

In another embodiment, the invention provides a fuel cell system having a first heat source (e.g., a fuel cell stack) and a first coolant circuit, wherein the first coolant circuit is adapted to circulate a first coolant through the fuel cell stack and remove heat from the first heat source. A second heat source (e.g., a fuel processing reactor) and a second coolant circuit are also included, wherein the second coolant circuit is adapted to circulate a second coolant through the second heat source to remove heat from the second heat source.

A first heat exchanger in the system includes a first coolant flow path and a second coolant flow path, wherein the heat exchanger is adapted to transfer heat from the first coolant to the second coolant when a first temperature of the first coolant is greater than a second temperature of the second coolant. A second heat exchanger is located along the second coolant circuit downstream from the first heat exchanger, the second heat exchanger being adapted to transfer heat from the second coolant circuit to a heat sink fluid when the second coolant in the second heat exchanger has a higher temperature than the heat sink fluid. A radiator system is provided that includes a radiator and a fan, the radiator system being located along the second coolant circuit between the first heat exchanger and the second heat exchanger. The radiator is adapted to remove heat from the second coolant circuit.

A controller is connected to a first pump that is adapted to vary a flow of the first coolant. The controller is also connected to a second pump that is adapted to vary a flow of the second coolant. As an example, the controller can be configured to vary a speed of the pump or radiator fan to maintain the heat sink fluid above a predetermined temperature.

In another aspect, the invention provides a fuel cell system with a system housing and a heat sink vessel. The heat sink vessel circulates a heat sink fluid. For example, the heat sink vessel can be a hot water tank that heats water by circulating it within the vessel, where the water is then flowed to another location for use outside the system housing. A portion of the heat sink vessel is contained in an interior of the system housing. It will be appreciated that in the context of this invention, the term portion can mean anywhere from less than 1% to 100%. The portion of the heat sink vessel includes a thermally conductive material. A system component is fixed onto the portion of the heat sink vessel such that heat is transferred from the system component to the heat sink vessel when a temperature of the system component is greater than a temperature of the portion of the heat sink vessel. The system component can be any of the following: a pump, a valve, a solenoid, a fuel cell stack end plate, a water tank, a blower, and a circuitry housing.

In another aspect, a fuel cell system is provided that includes a fuel cell, a fuel supply, an oxidant supply, a power demand sensor, a heat demand sensor, and a controller. The fuel cell is adapted to receive a fuel flow from the fuel supply, and an oxidant flow from the oxidant supply. The controller is connected to each of the fuel supply, oxidant supply, power demand sensor, and heat demand sensor. The controller is further adapted to receive a power demand signal from the power demand sensor and a heat demand signal from the heat demand sensor.

In a first state, the controller is configured to reduce at least one of the fuel flow and oxidant flow when there is no heat demand signal and no power demand signal. In a second state, the controller is configured to increase at least one of the fuel flow and oxidant flow when there is no heat demand signal and there is a power demand signal. In a third state, the controller is configured to increase at least one of the fuel flow and oxidant flow when there is no power demand signal and there is a heat demand signal. In a fourth state, the controller is configured to increase at least one of the fuel flow and oxidant flow when there is a power demand and a heat demand signal.

In some embodiments, the power demand sensor is a fuel cell voltage sensor that produces a power demand signal when a voltage of the fuel cell falls below a predetermined level. The power demand sensor can also be a fuel cell current sensor that produces a power demand signal when an output current of the fuel cell exceeds a predetermined level. The power demand sensor can also include a fuel cell output current sensor an electrical load sensor, wherein the power demand sensor produces a power demand signal when an electrical load on the fuel cell exceeds an output current of the fuel cell. It will be appreciated that the electrical load on the fuel cell can include a parasitic system electrical load and an application electrical load. For example, the parasitic load can refer to internal components such as pumps and blowers that are powered by the fuel cell. The application load can refer to a residential appliance, as an example.

The system can further include a coolant circuit and a heat sink, wherein the coolant circuit is adapted to transfer heat from the fuel cell to the heat sink. As an example, the heat demand sensor can be a temperature sensor that produces a heat demand signal when a temperature of the heat sink is below a predetermined level.

In one embodiment, the system can include a heat sink, a coolant circuit, and an oxidizer adapted to oxidize an exhaust gas of the fuel cell. The coolant circuit is configured to transfer heat from the fuel cell to the heat sink, and the heat demand sensor is a temperature sensor that produces a heat demand signal when a temperature of the heat sink is below a predetermined level. In another embodiment, the coolant circuit is adapted to transfer heat from the fuel cell to the heat sink, and a radiator is provided to remove heat from the coolant circuit. The radiator can include a fan connected to the controller, where the controller is configured to reduce an output of the fan when there is a heat demand signal. The controller is further configured to increase an output of the fan when there is no heat demand signal.

In another embodiment, the coolant circuit further includes a bypass valve and a radiator bypass circuit. The valve is connected to the controller, and the controller is adapted to actuate the valve to divert a coolant flow from the radiator to the radiator bypass circuit when there is a heat demand signal. The controller is further adapted to actuate the valve to divert the coolant flow from the radiator bypass circuit to the radiator when there is no heat demand signal.

The system can also include a fuel bypass circuit associated with the valve. In such a system, the valve is connected to the controller, and the fuel bypass circuit is adapted to divert a portion of the fuel flow from an inlet of the fuel cell to the oxidizer. The controller is configured to actuate the valve to divert the portion of fuel flow from the fuel cell inlet to the oxidizer when there is a heat demand signal. The controller is further adapted to actuate the valve to divert the portion of fuel flow from the fuel cell inlet to the oxidizer when there is no heat demand signal. As an example, the controller can include a computer usable medium (e.g., memory) having computer readable code embodied thereon (e.g., firmware or software). Preferably, the controller is also programmable.

Embodiments may further include a hydrogen separator, such as electrochemical hydrogen separator. On this subject, the teachings of U.S. Pat. No. 6,280,865 are hereby incorporated by reference. The hydrogen separator is adapted to receive the fuel flow from the fuel processor and separate hydrogen from the fuel flow into a reservoir when the hydrogen separator is activated. The controller is configured to activate the hydrogen separator when there is no power demand signal and there is a heat demand signal.

As an example, the hydrogen separator can include a membrane electrode assembly having an anode side and a cathode side. It is well known in the art that placing an electric potential across an electrochemical cell, such as a fuel cell, having no electrical load (as opposed to merely placing an electric load on the fuel cell as in the case of normal operation) will result in hydrogen being electrochemically "pumped" from fuel (e.g., reformate) in the anode to the cathode. This process proceeds essentially according to the same reactions at the anode and cathode of the fuel cell as in normal operation. Depending on the mechanical strength of the cell used in such a process, the hydrogen output is robust enough that such a process can be used to pressurize a vessel.

For example, such a cell can be placed along the flow path of the reformate being fed from the fuel processor to the fuel cell. When there is a heat demand, but no power demand, the controller reacts enough fuel in the fuel cell to produce the desired amount of heat. The excess power is sunk to the hydrogen separator to pressurize a hydrogen tank (e.g., at about two atmospheres), which will contain essentially pure hydrogen. The hydrogen tank reservoir can include a valve connected to the controller and associated with a conduit to the fuel cell such that the controller can selectively open the valve to supply hydrogen to the fuel cell (e.g., in response to a sudden load increase).

The hydrogen separator can be a PEM fuel cell (e.g., a PEM sandwiched on either side by a platinum based catalyst layer). The anode side is in fluid connection with the fuel flow from the fuel processor. The anode side and cathode side of the membrane electrode assembly each have an electrical connector (e.g., a wire connected to the each of the anode and cathode flow field plates. A power source is connected to the anode and cathode electrical connectors of the membrane electrode assembly and provides an electric potential across the connectors when the separator is in an active state. Similarly, the controller can remove the potential to put the separator in an inactive state. While the separator is in the inactive state, the reformate simply passes by it on the way to the fuel cell without effect. In some embodiments, the separator can also be used, as can the hydrogen reservoir supply to the fuel cell, when there is a power demand. This mode of operation offers additional flexibility that can be used by the controller to balance between the dynamic behavior of the heat and power demands.

In another aspect, the invention provides a method of operating a fuel cell system including the following steps: (1) providing a fuel flow and an oxidant flow to a fuel cell to produce electricity; (2) providing the electricity to an electrical load; (3) transferring heat from the fuel cell to a heat sink by circulating a first coolant through a first coolant circuit, wherein the first coolant circuit is adapted to remove heat from the fuel cell and is further adapted to transfer heat to the heat sink; (4) measuring a thermal parameter of the heat sink; (5) measuring an electrical parameter of the electrical load; (6) measuring a performance parameter of the fuel cell; (7) generating a power demand signal when a power output of the fuel cell indicated by the performance parameter is less than a power requirement of the electrical load indicated by the electrical parameter; (8) generating a heat demand signal when the thermal parameter of the heat sink is below a predetermined level; (9) reducing at least one of the fuel flow and oxidant flow when there is no heat demand signal and no power demand signal; (10) increasing at least one of the fuel flow and oxidant flow when there is no heat demand signal and there is a power demand signal; (11) increasing at least one of the fuel flow and oxidant flow when there is no power demand signal and there is a heat demand signal; and (12) increasing at least one of the fuel flow and oxidant flow when there is a power demand and a heat demand signal.

In one embodiment, the method may further include measuring a voltage of the fuel cell; and generating the power demand signal when the voltage of the fuel cell falls below a predetermined level. In another embodiment, the method can include measuring an output current of the fuel cell; and generating the power demand signal when the output current of the fuel cell exceeds a predetermined level. Another embodiment can include exhausting fuel gas from the fuel cell to an oxidizer; oxidizing the fuel gas in the oxidizer to generate heat; and transferring heat from the fuel cell to the heat sink by circulating a second coolant through a second coolant circuit, wherein the second coolant circuit is adapted to remove heat from the oxidizer and is further adapted to transfer heat to the heat sink.

As previously discussed, some embodiments may include a fuel bypass system to allow fuel to be fed directly to the oxidizer when heat is demanded. Methods associated with such embodiments may thus include diverting a portion of the fuel flow from an inlet of the fuel cell to the oxidizer in response to the heat demand signal.

In some cases, the first and second coolant circuits can be in fluid communication, where the first and second coolants are each portions of a common coolant flow. In other words, the first and second coolant circuits are different locations within a single coolant circuit. In various embodiments, either of the first or second coolants can be circulated through a radiator to remove heat from the first coolant. In one embodiment, the second coolant can be circulated through a radiator to remove heat from the first coolant. For example, system heat can be absorbed by the first coolant, transferred to the second coolant in a heat exchanger, and then expelled to ambient from the second coolant in a radiator. One advantage provided by such an arrangement is that the first coolant can be a dielectric stack coolant such as deionized water, whereas the second material can be an electrically conductive material such as tap water. The radiator can be made from a less expensive material since the tap water is flowed through it instead of the deionized water, which might require more expensive radiator materials to prevent corrosion.

As previously discussed, the heat sink can include a water tank. In such cases, the thermal parameter can be a temperature of water in the water tank. The heat sink can also be a body of air contained in a building. In such cases the thermal parameter can be a temperature of the air contained in the building. The heat sink can also be a generator portion of an adsorption cooling system. In such cases, the thermal parameter can be a temperature of the generator portion.

In another aspect, the invention provides a method of operating a fuel cell system including the following steps: (1) providing a fuel flow and an oxidant flow to a fuel cell stack to produce electricity; (2) providing the electricity to an electrical load; (3) transferring heat from the fuel cell stack to a heat sink by circulating a first coolant through a first coolant circuit, wherein the first coolant circuit is adapted to remove heat from the fuel cell stack and is further adapted to transfer heat to the heat sink; (4) measuring a thermal parameter of the heat sink; (5) generating a heat demand signal when the thermal parameter of the heat sink is below a predetermined level; and (6) shorting at least one fuel cell in the fuel cell stack in response to the heat demand signal.

When a fuel cell is electrically shorted (e.g., the anode electrode is electrically connected to the cathode electrode, essentially all of the energy produced is converted to heat energy. While this may harm a fuel cell if it is operated is this manner too long or if the fuel cell is allowed to overheat, operating the cell in a shorted mode for controlled periods of time can provide a desired increase in heat from the fuel cell while not harming its performance or reliability. For example, a sulfonated fluorocarbon PEM fuel cell operated in this manner might be kept under 100° C., as an example, either by modulating the coolant flow through the cell or by removing the short connection at a desired point. As an example, the short connection can be a jumper placed between an anode electrode and a cathode electrode, wherein the jumper has a switch that can be actuated by the system controller.

As in previous examples, the heat sink can be a water tank, a body of air contained in a building, a generator portion of an adsorption cooling system, etc. The thermal parameter generally refers to a temperature of the heat sink.

In another aspect, the invention provides a method of operating a fuel cell system, including the following steps: (1) providing a fuel flow and an oxidant flow to a fuel cell stack to produce electricity; (2) providing the electricity to an electrical load; (3) transferring heat from the fuel cell stack to a heat sink by circulating a first coolant through a first coolant circuit, wherein the first coolant circuit is adapted to remove heat from the fuel cell stack and is further adapted to transfer heat to the heat sink; (4) measuring a thermal parameter of the heat sink; (5) generating a heat demand signal when the thermal parameter of the heat sink is below a predetermined level; and (6) selectively connecting at least two fuel cells in the fuel cell stack in parallel in response to the heat demand signal.

Without wishing to be bound by theory, a group of fuel cells generally produce a greater amount of waste heat when they are connected in parallel rather than in series. One reason is that the cells generally operate at a lower efficiency in such a configuration, so that more waste heat is generated. Thus, the invention provides an embodiment where the balance between the heat and power demand signals is accommodated by selectively connecting at least two fuel cells within a group to increase the amount of heat that is generated for a given amount of power production. Where a system is adapted to selectively connect one or more cells in parallel, the cells that are selectively connected are connected via a switched network, rather than being stack in series as in a conventional stack. For example, two fuel cells may be connected to a switch that is connected to two electrical paths. When the system controller causes the switch to select one of the paths, this results in the cell being connected in series with another cell. When the other path is selected, the cell will be connected in parallel (e.g., connected to a common bus).

As in previous examples, the heat sink can be a water tank, a body of air contained in a building, a generator portion of an adsorption cooling system, etc. The thermal parameter generally refers to a temperature of the heat sink.

In another aspect, the invention provides a method of operating a fuel cell system, including the following steps: (1) providing a fuel flow and an oxidant flow to a fuel cell stack to produce electricity; (2) providing the electricity to an electrical load; (3) transferring heat from the fuel cell stack to a heat sink by circulating a first coolant through a first coolant circuit, wherein the first coolant circuit is adapted to remove heat from the fuel cell stack and is further adapted to transfer heat to the heat sink; (4) measuring a thermal parameter of the heat sink; (5) generating a heat demand signal when the thermal parameter of the heat sink is below a predetermined level; and (6) selectively operating the fuel cell in a low efficiency mode in response to the heat demand signal.

There are various fuel cell operating regimes that result in relatively low efficiency operation and the production of relatively high amounts of waste heat. Prior art systems are generally configured to avoid such regimes as a means of maximizing system efficiency. However, in systems balancing both heat demand and power demand signals, it may be desirable to switch between such modes. Other examples of low efficiency operating modes include reactant starvation, operation at temperatures outside the normal operating range of a fuel cell, and producing a given amount of power at low voltage and high current (e.g., cell voltages less than 0.4 volts).

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A method of operating a fuel cell system, comprising:
providing a fuel flow and an oxidant flow to a fuel cell stack to produce electricity;
providing the electricity to an electrical load;
transferring heat from the fuel cell stack to a heat sink by circulating a first coolant through a first coolant circuit, wherein the first coolant circuit is adapted to remove heat from the fuel cell stack and is further adapted to transfer heat to the heat sink;
measuring a thermal parameter of the heat sink;
generating a heat demand signal when the thermal parameter of the heat sink is below a predetermined level; and
shorting at least one fuel cell in the fuel cell stack in response to the heat demand signal.

2. The method of claim 1, wherein the heat sink comprises a water tank, and wherein the thermal parameter is a temperature of water in the water tank.

3. The method of claim 1, wherein the heat sink comprises air contained in a building, and wherein the thermal parameter comprises a temperature of the air contained in the building.

4. The method of claim 1, wherein the heat sink comprises a generator portion of an adsorption cooling system and wherein the thermal parameter is a temperature of the generator portion.

5. A method comprising:
providing a reactant flow to a fuel cell stack to produce electricity;
selectively shorting at least one fuel cell of the fuel cell stack to increase a thermal output from the fuel cell stack;
transferring heat from the fuel cell stack to a heat sink;
measuring a thermal parameter of the heat sink; and
generating a heat demand signal to control shorting of said at least one fuel cell stack in response to the thermal parameter of the heat sink.

6. The method of claim 5, wherein the heat sink comprises air contained in a building, and wherein the thermal parameter comprises a temperature of the air contained in the building.

7. The method of claim 5, wherein the heat sink comprises a generator portion of an adsorption cooling system and wherein the thermal parameter is a temperature of the generator portion.

8. A method comprising:
providing a reactant flow to a fuel cell stack to produce electricity; and
based on a thermal parameter of a heat sink that is thermally coupled to the fuel cell stack, selectively shorting at least one fuel cell of the fuel cell stack.

9. The method of claim 8, wherein the heat sink comprises air contained in a building, and wherein the thermal parameter comprises a temperature of the air contained in the building.

10. The method of claim 8, wherein the heat sink comprises a generator portion of an adsorption cooling system and wherein the thermal parameter is a temperature of the generator portion.

* * * * *